United States Patent
Xu et al.

(10) Patent No.: US 11,011,140 B2
(45) Date of Patent: May 18, 2021

(54) IMAGE RENDERING METHOD AND APPARATUS, AND VR DEVICE

(71) Applicant: Huawei Technologies Co., Ltd., Shenzhen (CN)

(72) Inventors: Yu Xu, Taiwan (CN); Jinghua Sima, Shenzhen (CN); Kai Shao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/349,748

(22) PCT Filed: Aug. 17, 2017

(86) PCT No.: PCT/CN2017/097938
§ 371 (c)(1),
(2) Date: May 14, 2019

(87) PCT Pub. No.: WO2018/086399
PCT Pub. Date: May 17, 2018

(65) Prior Publication Data
US 2019/0355325 A1 Nov. 21, 2019

(30) Foreign Application Priority Data

Nov. 14, 2016 (CN) .......................... 201611000176.2
Apr. 6, 2017 (CN) .......................... 201710222064.X (51) Int. Cl.
*G09G 5/00* (2006.01)
*G09G 5/36* (2006.01)
(Continued)

(52) U.S. Cl.
CPC ............ *G09G 5/363* (2013.01); *G06F 3/012* (2013.01); *G09G 5/14* (2013.01); *G09G 2354/00* (2013.01); *G09G 2360/04* (2013.01)

(58) Field of Classification Search
USPC ............... 345/7, 8, 156, 633, 173, 174, 179; 348/43, 584; 358/3.09; 710/1; 382/124
See application file for complete search history.

(56) References Cited

U.S. PATENT DOCUMENTS

| | | | |
|---|---|---|---|
| 8,294,633 B2 | 10/2012 | Cernasov | |
| 2004/0107301 A1* | 6/2004 | Sato | G06K 9/0002 710/1 |

(Continued)

FOREIGN PATENT DOCUMENTS

| | | |
|---|---|---|
| CN | 1930587 A | 3/2007 |
| CN | 103761763 A | 4/2014 |

(Continued)

OTHER PUBLICATIONS

Machine Translation and Abstract of Chinese Publication No. CN105913478, Aug. 31, 2016, 11 pages.

(Continued)

*Primary Examiner* — Thuy N Pardo
(74) *Attorney, Agent, or Firm* — Conley Rose, P.C.

(57) ABSTRACT

An image rendering method and apparatus relate to the field of communications technologies and include a moving direction of a head of a user wearing a virtual reality (VR) device being detected, at least two rendering areas in a display interface being determined based on the moving direction, and then images displayed in different rendering areas being rendered using different rendering intensity coefficients, where a rendering intensity coefficient of a rendering area to which the moving direction points is greater than a rendering intensity coefficient of a rendering area to which an opposite direction of the moving direction points.

20 Claims, 6 Drawing Sheets

(51) Int. Cl.
*G06F 3/01* (2006.01)
*G09G 5/14* (2006.01)

(56) References Cited

U.S. PATENT DOCUMENTS

| | | | |
|---|---|---|---|
| 2007/0183649 A1 | 8/2007 | Kiefer et al. | |
| 2008/0074701 A1* | 3/2008 | Asai | H04N 1/4055 358/3.09 |
| 2008/0089564 A1* | 4/2008 | Sato | G06F 3/03547 382/124 |
| 2009/0237564 A1* | 9/2009 | Kikinis | H04N 13/398 348/584 |
| 2014/0218355 A1 | 8/2014 | Wilkins et al. | |
| 2014/0364208 A1 | 12/2014 | Perry | |
| 2016/0018887 A1* | 1/2016 | Tsukahara | G02B 27/0172 345/8 |
| 2016/0062459 A1* | 3/2016 | Publicover | G02B 27/0093 345/633 |
| 2016/0065947 A1* | 3/2016 | Cole | H04N 13/194 348/43 |
| 2016/0148431 A1 | 5/2016 | Seydoux et al. | |
| 2016/0189429 A1* | 6/2016 | Mallinson | H04N 13/398 345/633 |
| 2017/0076433 A1* | 3/2017 | Hellier | H04N 1/4092 345/8 |
| 2017/0160795 A1 | 6/2017 | Hu | |
| 2018/0188534 A1* | 7/2018 | Stafford | A63F 13/212 345/7 |

FOREIGN PATENT DOCUMENTS

| | | |
|---|---|---|
| CN | 105204642 A | 12/2015 |
| CN | 105392538 A | 3/2016 |
| CN | 105763790 A | 7/2016 |
| CN | 105898138 A | 8/2016 |
| CN | 105898338 A | 8/2016 |
| CN | 105913478 A | 8/2016 |
| CN | 105976424 A | 9/2016 |
| CN | 106101533 A | 11/2016 |
| EP | 3003517 B1 | 5/2019 |
| WO | 2014204330 A1 | 12/2014 |
| WO | 2016022279 A2 | 2/2016 |

OTHER PUBLICATIONS

Machine Translation and Abstract of Chinese Publication No. CN106101533, Nov. 9, 2016, 22 pages.
Foreign Communication From a Counterpart Application, PCT Application No. PCT/CN2017/097938, English Translation of International Search Report dated Nov. 13, 2017, 2 pages.
Foreign Communication From a Counterpart Application, PCT Application No. PCT/CN2017/097938, English Translation of Written Opinion dated Nov. 13, 2017, 3 pages.
Machine Translation and Abstract of Chinese Publication No. CN105204642, Dec. 30, 2015, 33 pages.
Machine Translation and Abstract of Chinese Publication No. CN105898138, Aug. 24, 2016, 19 pages.
Machine Translation and Abstract of Chinese Publication No. CN105898338, Aug. 24, 2016, 13 pages.
Foreign Communication From a Counterpart Application, Chinese Application No. 201780067583.1, Chinese Office Action dated Dec. 20, 2019, 16 pages.
Guenter, B., et al., "Foveated 3D Graphics", XP55199808, ACM SIGGRAPH Asia, Nov. 2012, 10 pages.
Foreign Communication From a Counterpart Application, European Application No. 17869811.4, Extended European Search Report dated Oct. 11, 2019, 8 pages.

* cited by examiner

IMAGE RENDERING METHOD AND APPARATUS, AND VR DEVICE

CROSS-REFERENCE TO RELATED APPLICATIONS

This application is a U.S. National Stage of International Patent Application No. PCT/CN2017/097938 filed on Aug. 17, 2017, which claims priority to Chinese Patent Application No. 201611000176.2 filed on Nov. 14, 2016 and Chinese Patent Application No. 201710222064.X filed on Apr. 6, 2017. All of the aforementioned applications are hereby, incorporated by reference in their entireties.

TECHNICAL FIELD

This application relates to the field of network communications technologies, and in particular, to an image rendering method and apparatus, and a VR device.

BACKGROUND

Visual acuity of a human eye is divided into two parts: central visual acuity and peripheral visual acuity. The central visual acuity is used to provide precise detailed visual content, and the peripheral visual acuity is used to provide a picture in a wide-angle field of view. Based on this physiological feature of the human eye, during VR rendering, a picture of the peripheral visual acuity is usually rendered in low picture quality, and a picture of the central visual acuity is usually rendered in high picture quality, to reduce a calculation amount of a graphics processing unit (Graphics Processing Unit, GPU) in a virtual reality (Virtual Reality, VR) rendering process.

An existing image rendering method is to track a human eyeball by using a human eye tracking technology and a device such as an infrared sensor or a camera to determine a point of gaze of the human eye, and then determine a central visual acuity area and a peripheral visual acuity area with reference to a focus rendering technology. During VR rendering, rendering in high definition is performed in the central visual acuity area, and rendering in low picture quality is performed in the peripheral visual acuity area. Although a calculation amount of a GPU is reduced by using the technology, an additional device (such as the infrared sensor or the camera) is required to track eyeball movement. As a result, implementation is relatively complex.

SUMMARY

Embodiments of this application provide an image rendering method and apparatus, and a VR device, so that a prior-art problem that a method for rendering an image by using a human eye tracking technology is relatively complex can be resolved.

To achieve the foregoing objective, the following technical solutions are used in the embodiments of this application.

According to a first aspect, an embodiment of this application provides an image rendering method. The method includes: detecting, by a VR device, a moving direction of the head of a user wearing the VR device: determining at least two rendering areas in a display interface based on the moving direction; and then rendering, by using different rendering intensity coefficients, images displayed in different rendering areas, where a rendering intensity coefficient of a rendering area to which the moving direction points is greater than a rendering intensity coefficient of a rendering area to which an opposite direction of the moving direction points. It can be learned that there is no need to use a human eye tracking technology to track an eyeball to determine a central visual acuity area and a peripheral visual acuity area. In this application, the moving direction of the head of the user is detected, so that rendering can be performed in the different rendering areas by using the different rendering intensity coefficients. Rendering intensity of a rendering area on which the user visually focuses is higher, and rendering intensity of a rendering area on which the user does not visually focus is lower. In this way, a calculation amount of a GPU is reduced, and there is no need to use the complex human eye tracking technology, thereby reducing complexity in an image rendering process.

In a possible design, the determining at least two rendering areas in a display interface based on the moving direction may be specifically implemented as follows: determining, by the VR device, that an area with a preset range centered at a center point of the display interface is a high rendering area, that an area to which the moving direction points is a middle rendering area, and that an area other than the high rendering area and the middle rendering area in the display interface is a low rendering area. It can be learned that a center area in the display interface of the VR device is usually a visual center area of a human eye, and the moving direction of the head of the user represents a change direction of a user's field of view. Therefore, the area with the preset range centered at the center point of the display interface is determined as the high rendering area, and the area to which the moving direction points is determined as the middle rendering area, so that a final rendered picture more conforms to a visual feature of the human eye, and definition of a picture displayed in a visual center of the human eye is ensured while a calculation amount of a GPU is reduced.

In a possible design, the VR device includes a left display interface and a right display interface, each display interface is divided into at least three rendering areas, an area with a preset range centered at a center point of each display interface is a first rendering area, an area that is to the left of the center point and that is other than the first rendering area in each display interface is a second rendering area, and an area that is to the right of the center point and that is other than the first rendering area in each display interface is a third rendering area.

In a possible design, the determining at least two rendering areas in a display interface based on the moving direction may be specifically implemented as follows:

if the head of the user wearing the VR device is in a still state, determining that in the left display interface, a first rendering area is a high rendering area, a third rendering area is a middle rendering area, and a second rendering area is a low rendering area and that in the right display interface, a first rendering area is a high rendering area, a second rendering area is a middle rendering area, and a third rendering area is a low rendering area; or if the moving direction is from left to right, determining that in the left display interface, a first rendering area is a high rendering area, a third rendering area is a middle rendering area, and a second rendering area is a low rendering area; and that in the right display interface, a first rendering area is a high rendering area, a third rendering area is a middle rendering area, and a second rendering area is a low rendering area; or if the moving direction is from right to left, determining that in the left display interface, a first rendering area is a high rendering area, a second rendering area is a middle rendering area, and a third rendering area is a low rendering area and that in the right display interface, a first rendering area is a high rendering area, a second rendering area is a middle rendering area, and a third rendering area is a low rendering area.

It can be learned that rendering intensity of each area in the display interface is adjusted by using the moving direction of the head of the user, so that a picture in a user's visual center range can always be rendered in higher intensity, and a picture on which the user does not focus is rendered in low intensity. In this way, the user can watch a clear picture in real time by using the VR device while a calculation amount of a GPU is reduced.

In a possible design, a first rendering intensity coefficient is 1, a second rendering intensity coefficient is greater than 0.5 and less than 1, and a third rendering intensity coefficient is greater than 0.2 and less than 0.5.

In a possible design, the preset range is a range corresponding to an inscribed square of a circle whose radius is 65% of a half diagonal of the display interface.

According to a second aspect, an embodiment of this application provides an image rendering apparatus. The apparatus may implement a function performed by the VR device in the first aspect. The function may be implemented by hardware, or may be implemented by hardware by executing corresponding software. The hardware or the software includes one or more modules corresponding to the function.

In a possible design, a structure of the apparatus includes a processor, a motion sensor, and a communications interface. The motion sensor is configured to detect a moving direction of the head of a user wearing a VR device. The processor is configured to support the apparatus in performing a corresponding function in the foregoing method. The communications interface is configured to support the apparatus in communicating with another network element. The apparatus may further include a memory. The memory is configured to be coupled to the processor and the motion sensor, and the memory stores a program instruction and data that are necessary for the apparatus.

According to a third aspect, an embodiment of this application provides a computer readable storage medium, and the computer readable storage medium stores an instruction. When the instruction is run on a computer, the computer is enabled to perform the method in the first aspect.

According to a fourth aspect, an embodiment of this application provides a computer program product including an instruction. When the instruction is run on a computer, the computer is enabled to perform the method in the first aspect.

Compared with the prior art, in this application, the VR device may detect the moving direction of the head of the user wearing the VR device, and then determine the at least two rendering areas based on the moving direction. There is no need to use the human eye tracking technology to determine the central visual acuity area and the peripheral visual acuity area, and the rendering intensity of each area can be determined provided that the change direction of the user's field of view is determined based on the moving direction of the head of the user. Therefore, an implementation process is relatively simple. The rendering intensity coefficient of the rendering area to which the moving direction points is greater than the rendering intensity coefficient of the rendering area to which the opposite direction of the moving direction points. This ensures higher picture quality of the area on which the user visually focuses and lower picture quality of the peripheral visual acuity area, thereby reducing image rendering complexity without increasing a calculation amount of a GPU.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

A system architecture and a service scenario described in this application are intended to more clearly describe technical solutions in this application, but constitute no limitation on the technical solutions provided in this application. A person of ordinary skill in the art may learn that as the system architecture evolves and a new service scenario emerges, the technical solutions provided in this application are also applicable to similar technical problems.

It should be noted that in this application, a word such as "example" or "for example" is used to indicate an example, an illustration, or a description. Any embodiment or design scheme described as an "example" or "for example" in this application should not be explained as being better or having more advantages than another embodiment or design scheme. Exactly, use of the word such as "example" or "for example" is intended to present a related concept in a specific manner.

It should be noted that "of (English: of)", "corresponding (English: corresponding, relevant)", and "corresponding (English: corresponding)" may be interchangeably used sometimes in this application. It should be noted that expressed meanings are consistent when differences are not emphasized.

In the specification and claims of this application, terms "first", "second", and the like are intended to distinguish between different objects but do not describe a particular order of the objects. For example, a first rendering area, a second rendering area, a third rendering area, and the like are intended to distinguish between different areas in a display interface but do not describe a particular order of the rendering areas.

The following describes in detail the technical solutions in this application with reference to the accompanying drawings in this application.

Figure 1:
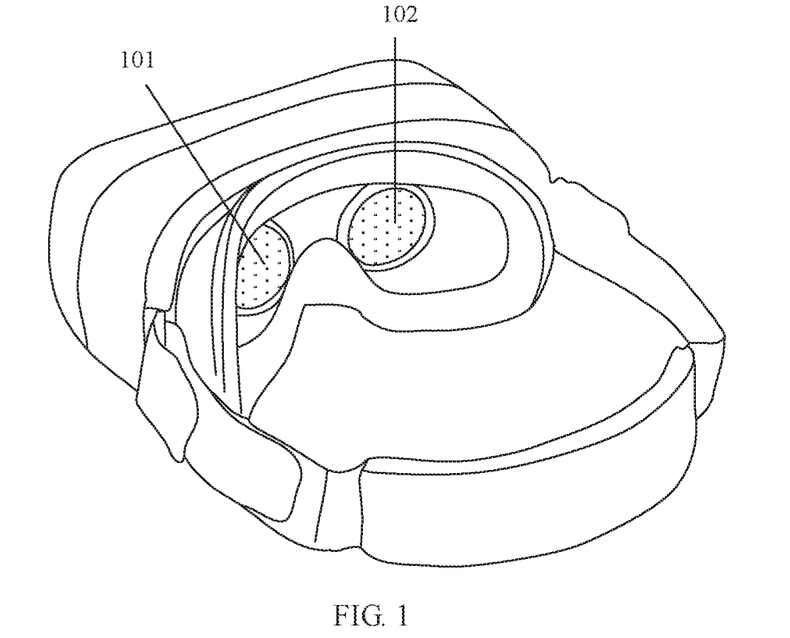
FIG. 1 is a schematic diagram of an example of a VR device according to an embodiment of this application.

The technical solutions provided in this application may be applied to a VR device. The VR device may be a device such as VR glasses or a VR helmet. FIG. 1 is a schematic diagram of an example of a VR device. The VR device includes two display interfaces: a left display interface 101 and a right display interface 102. The left display interface 101 is configured to provide a left eye of a user with a displayed image, and the right display interface 102 is configured to provide a right eye of the user with a displayed image. It should be noted that, that both of the display interfaces in FIG. 1 are in a shape of a circle is used as an example. However, a shape of the display interface is not limited in this embodiment of this application, for example, may alternatively be a square.

Figure 2:
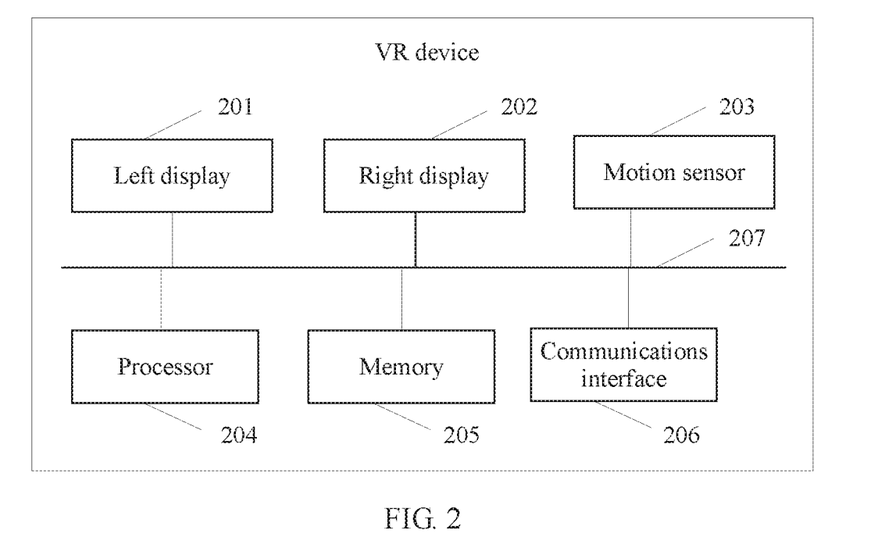
FIG. 2 is a schematic structural diagram of a VR device according to an embodiment of this application.

As shown in FIG. 2, the VR device may include a left display 201, a right display 202, a motion sensor 203, a processor 204, a memory 205, a communications interface 206, and a bus 207. The bus 207 is configured to implement connections between these apparatuses.

The left display 201 and the right display 202 are display tools that display device data in a display interface and then reflect the device data to a human eye. An image on the left display 201 may be displayed in the left display interface 101 and be reflected to the left eye of the user, and an image on the right display 102 may be displayed in the right display interface 102 and be reflected to the right eye of the user.

The motion sensor 203 is a detection apparatus, may sense measured information, and can convert, according to a specific rule, the sensed information into an electrical signal or information in another required form for output. In this embodiment of this application, the motion sensor 203 may be configured to detect a moving direction of the head of the user, and the motion sensor 203 may be specifically an inertial measurement unit (Inertial measurement unit, IMU).

The processor 204 may be a central processing unit (English: Central Processing Unit, CPU), may be an application-specific integrated circuit (English: Application-Specific Integrated Circuit, ASIC), or may be one or more integrated circuits configured to implement this embodiment of the present invention, for example, one or more digital signal processors (English: Digital Signal Processor, DSP) or one or more field programmable gate arrays (English: Field Programmable Gate Array, FPGA). The processor 204 has a processing and management function. Specifically, the processor 204 in the VR device may obtain the moving direction that is of the head of the user and that is detected by the motion sensor 203, and generate display data of the left display 201 and the right display 202.

The memory 205 may be a read-only memory (Read-Only Memory, ROM) or another type of static storage device that can store static information and instructions, or a random access memory (Random Access Memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 205 is not limited thereto. The memory 205 may exist independently and is connected to the processor 204 by using the bus 207. The memory 205 may alternatively be integrated with the processor 204.

The communications interface 206 may be implemented by using an antenna, and may be configured to exchange data with an external network element.

The following specifically describes, with reference to the VR device shown in FIG. 1 and FIG. 2, an image rendering method provided in this application.

Figure 3:
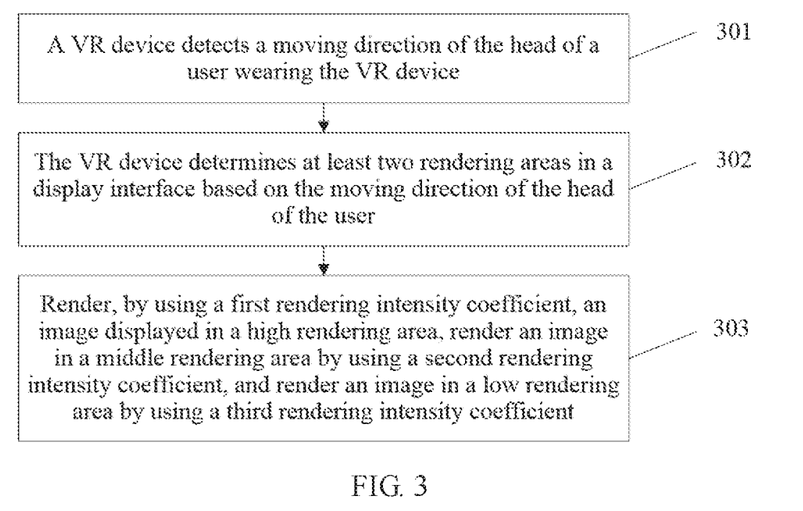
FIG. 3 is a flowchart of an image rendering method according to an embodiment of this application.

As shown in FIG. 3, an embodiment of this application provides an image rendering method, to resolve a prior-art problem that a method for rendering an image by using a human eye tracking technology is relatively complex. The method includes the following steps.

301. A VR device detects a moving direction of the head of a user wearing the VR device.

Figure 4:
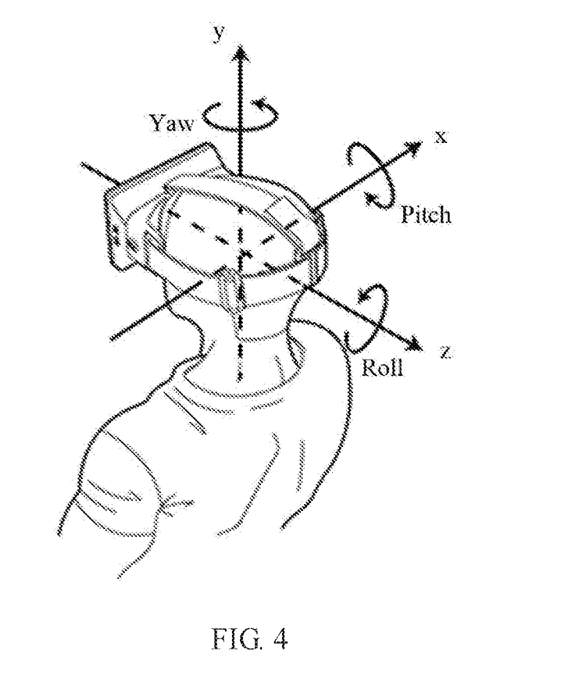
FIG. 4 is a schematic diagram of a method for determining a moving direction of the head of a user wearing a VR device according to an embodiment of this application.

With reference to FIG. 2, a motion sensor in the VR device may detect the moving direction of the head of the user. After wearing the VR device, the user may change, by moving the head, an angle of view of watching an image. As shown in FIG. 4, the motion sensor in the VR device can determine the moving direction of the head of the user by using three Euler angles. A pitch (pitch) angle is used to represent an angle of a rotation around the x-axis, a yaw (yaw) angle is used to represent an angle of a rotation around the y-axis, and a roll (roll) angle is used to represent an angle of a rotation around the z-axis.

A field of view of a human eye is divided into a horizontal field of view and a vertical field of view. Based on a feature of the human eye, there are a relatively large quantity of horizontal scanning activities, in other words, most browsing behaviors of people are horizontal scanning. During horizontal scanning, the head usually rotates around the y-axis, and the moving direction may be represented as horizontally leftward or horizontally rightward. When the field of view of the human eye is the vertical field of view, the moving direction may be represented as vertically upward or vertically downward. Alternatively, the user's field of view may change obliquely. To be specific, the moving direction may be represented as from lower left to upper right, from upper right to lower left, from upper left to lower right, or from lower right to upper left.

302. The VR device determines at least two rendering areas in a display interface based on the moving direction of the head of the user.

Figure 5:
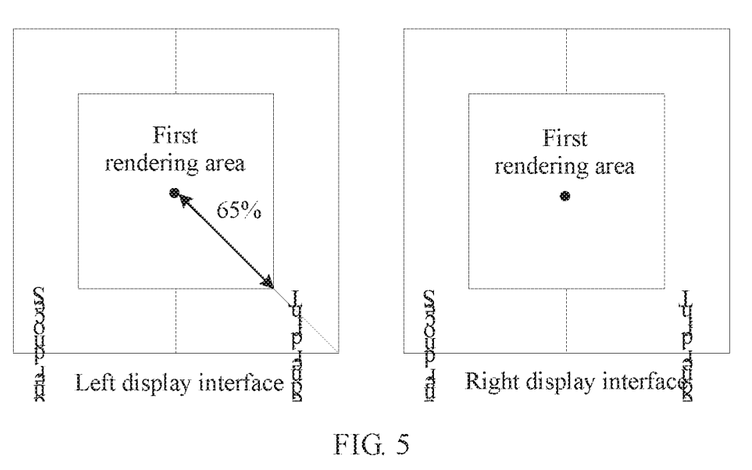
FIG. 5 is a schematic diagram of an example of a display interface of a VR device according to an embodiment of this application.

For example, the display interface may be divided into two rendering areas. A rendering area to which the moving direction of the head of the user points is a high rendering area, and a rendering area to which an opposite direction of the moving direction of the head of the user points is a low rendering area. For another example, each display interface may be divided into three areas. As shown in FIG. 5, an area with a preset range centered at a center point of the display interface is a first rendering area, an area that is to the left of the center point and that is other than the first rendering area in the display interface is a second rendering area, and an area that is to the right of the center point and that is other than the second rendering area in the display interface is a third rendering area.

The preset range may be an area corresponding to an inscribed square of a circle whose radius is 65% of a half diagonal of the display interface. A total angle of a horizontal field of view of two eyes of an ordinary person is 200° to 220°. An angle of view in which clear imaging can be performed in the two eyes is approximately 120°, in other words, an angle of a field of view of a single eye is 60°. Considering that there is a cross field of view area between the two eyes, the angle of the field of view of the single eye may be set to approximately 65°, and then the area corresponding to the inscribed square of the circle whose radius is 65% of the half diagonal of each display interface of the VR device is determined based on the angle of the field of view of the person's single eye.

The first rendering area is an area that is in the display interface and that corresponds to a visual center of the human eye. Therefore, the first rendering area is usually a high rendering area. A middle rendering area and a low rendering area change with the moving direction of the head of the user. An area to which the moving direction of the head of the user points is the middle rendering area, and an area other than the high rendering area and the middle rendering area in the display interface is the low rendering area.

Figure 6:
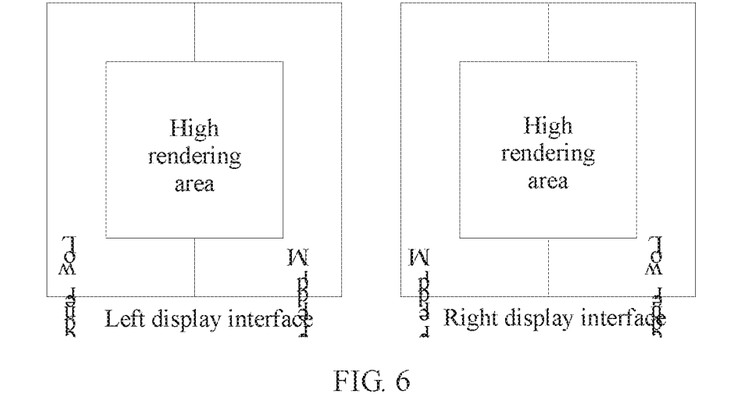
FIG. 6 is a schematic diagram of an example of an image rendering method according to an embodiment of this application.

As shown in FIG. 6, if the head of the user wearing the VR device is in a still state, it indicates that the human eye is in a looking-straight state. Therefore, areas corresponding to visual centers should be high rendering areas, areas corresponding to a part between two eyes are middle rendering areas, and remaining areas are low rendering areas. To be specific, in a left display interface, a first rendering area is a high rendering area, a third rendering area is a middle rendering area, and a second rendering area is a low rendering area; and in a right display interface, a first rendering area is a high rendering area, a second rendering area is a middle rendering area, and a third rendering area is a low rendering area.

Figure 7:
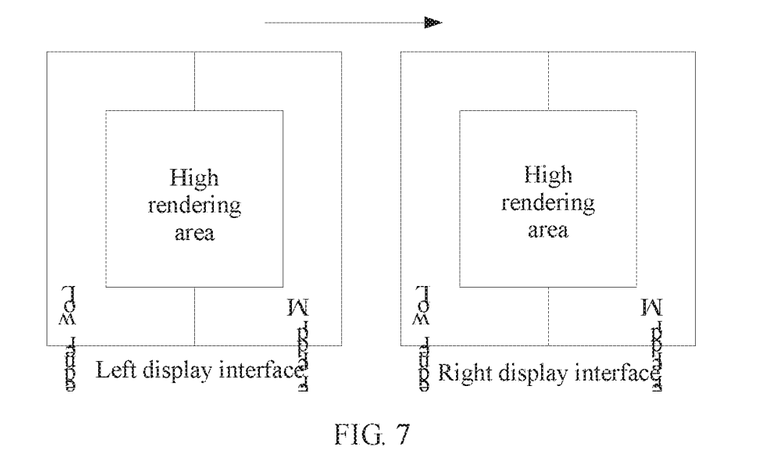
FIG. 7 is a schematic diagram of an example of another image rendering method according to an embodiment of this application.

As shown in FIG. 7, if the moving direction of the head of the user wearing the VR device is from left to right, it indicates that a change direction of the field of view of the human eye is from left to right. In this case, it is determined that in a left display interface, a first rendering area is a high rendering area, a third rendering area is a middle rendering area, and a second rendering area is a low rendering area and that in the right display interface, a first rendering area is a high rendering area, a third rendering area is a middle rendering area, and a second rendering area is a low rendering area.

Figure 8:
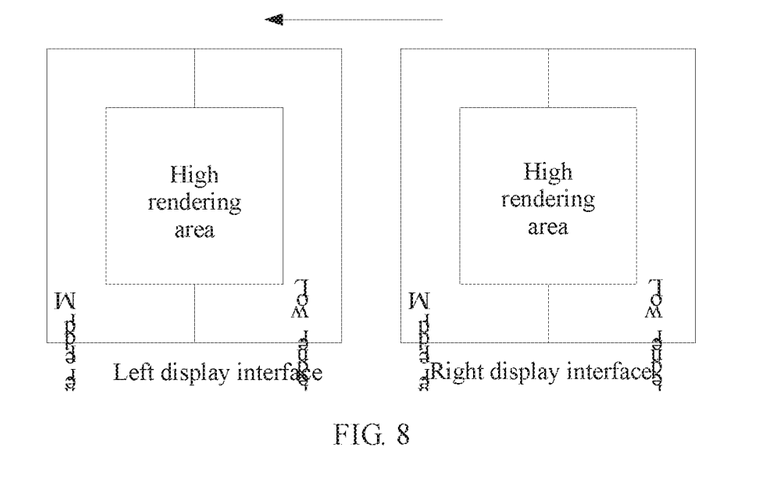
FIG. 8 is a schematic diagram of an example of another image rendering method according to an embodiment of this application.

As shown in FIG. 8, if the moving direction of the head of the user wearing the VR device is from right to left, it indicates that a change direction of the field of view of the human eye is from right to left. In this case, it is determined that in a left display interface, a first rendering area is a high rendering area, a second rendering area is a middle rendering area, and a third rendering area is a low rendering area and that in a right display interface, a first rendering area is a high rendering area, a second rendering area is a middle rendering area, and a third rendering area is a low rendering area.

It should be noted that a division manner of the display interface is not limited to the division manner described above, and the division manner of the display interface is not limited in this application. After the rendering areas obtained by dividing the display interface are determined, the high rendering area, the middle rendering area, and the low rendering area in the display interface may be determined based on the moving direction of the head of the user wearing the VR device.

303. Render, by using different rendering intensity coefficients, images displayed in different rendering areas.

A rendering intensity coefficient of a rendering area to which the moving direction of the head of the user points is greater than a rendering intensity coefficient of a rendering area to which an opposite direction of the moving direction points. It may be understood that the moving direction of the head of the user represents a change direction of the user's field of view. An image displayed in an area on which the user focuses in the field of view should be clearer than an image displayed in an area on which the user does not focus in the field of view. Therefore, the rendering intensity coefficient of the rendering area to which the moving direction of the head of the user points is greater than the rendering intensity coefficient of the rendering area to which the opposite direction of the moving direction points.

In all of FIG. 6 to FIG. 8, an image displayed in the high rendering area may be rendered by using a first rendering intensity coefficient, an image in the middle rendering area may be rendered by using a second rendering intensity coefficient, and an image in the low rendering area may be rendered by using a third rendering intensity coefficient.

The first rendering intensity coefficient is greater than the second rendering intensity coefficient, and the second rendering intensity coefficient is greater than the third rendering intensity coefficient.

For example, a maximum rendering intensity coefficient is 1. Therefore, a rendering intensity coefficient of the high rendering area is $\beta$, where $\beta=1$; a rendering intensity coefficient of the middle rendering area is $\delta$, where $0.5<\delta<1$; and a rendering intensity coefficient of the low rendering area is $\theta$, where $0<\theta<0.5$.

According to the image rendering method provided in this embodiment of this application, the VR device may detect the moving direction of the head of the user wearing the VR device, and then determine the high rendering area, the middle rendering area, and the low rendering area in each display interface based on the moving direction. There is no need to use the human eye tracking technology to determine a central visual acuity area and a peripheral visual acuity area, and rendering intensity of each area can be determined provided that the change direction of the user's field of view is determined based on the moving direction of the head of the user. Therefore, an implementation process is relatively simple. In addition, the rendering intensity coefficients used in the high rendering area, the middle rendering area, and the low rendering area gradually decrease. This ensures higher picture quality of the central visual acuity area and lower picture quality of the peripheral visual acuity area, thereby reducing image rendering complexity without increasing a calculation amount of a GPU.

Figure 9:
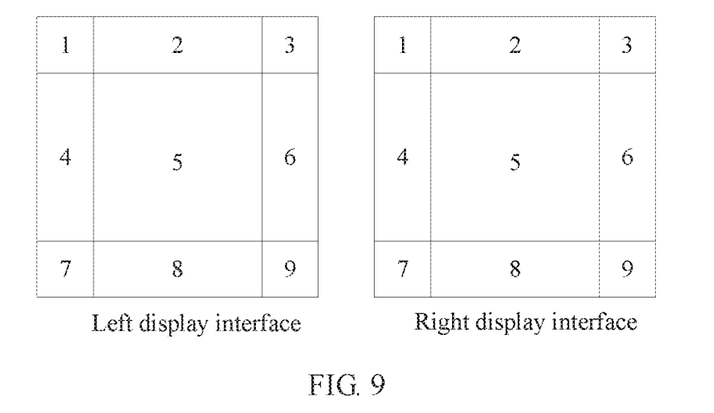
FIG. 9 is a schematic diagram of an example of a display interface of another VR device according to an embodiment of this application.

It should be noted that another division manner of the display interface may alternatively be used in this embodiment of this application. For example, as shown in FIG. 9, a left display interface and a right display interface each may be divided into nine areas that are successively a first to a ninth rendering areas from upper left to lower right. The central fifth rendering area corresponds to the visual center of the human eye, and is a high rendering area. Rendering intensity of other rendering areas is determined based on the moving direction of the head of the user wearing the VR device.

Figure 10:
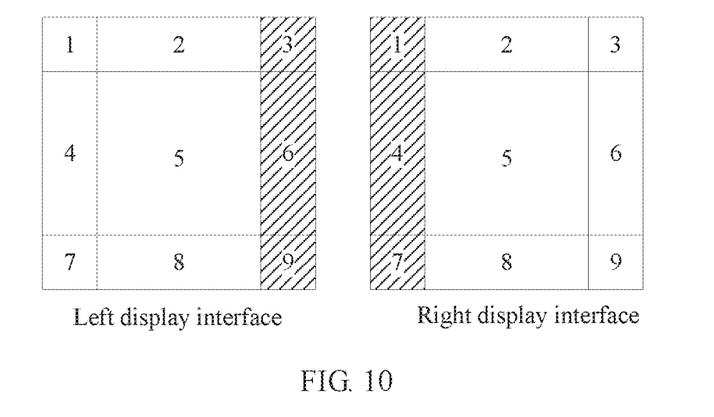
FIG. 10 is a schematic diagram of an example of another image rendering method according to an embodiment of this application.

As shown in FIG. 10, if the head of the user wearing the VR device is in a still state, both the fifth rendering areas that are in the left display interface and the right display interface and that correspond to visual centers are high rendering areas, the third rendering area, the sixth rendering area, and the ninth rendering area in the left display interface are middle rendering areas (corresponding to a shaded part in the left display interface in FIG. 10), the first rendering area, the fourth rendering area, and the seventh rendering area in the right display interface are middle rendering areas (corresponding to a shaded part in the right display interface in FIG. 10), and other areas are low rendering areas.

Figure 11:
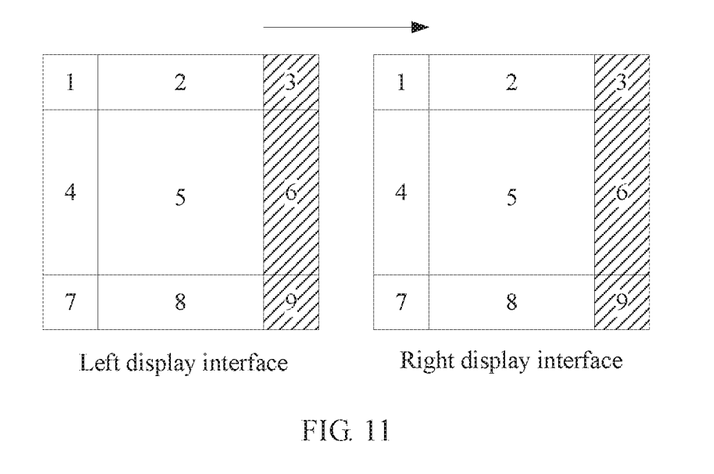
FIG. 11 is a schematic diagram of an example of another image rendering method according to an embodiment of this application.

As shown in FIG. 11, if the moving direction of the head of the user wearing the VR device is from left to right, both the fifth rendering areas that are in the left display interface and the right display interface and that correspond to visual centers are high rendering areas, the third rendering area, the sixth rendering area, and the ninth rendering area in the left display interface are middle rendering areas (corresponding to a shaded part in the left display interface in FIG. 11), the third rendering area, the sixth rendering area, and the ninth rendering area in the right display interface are middle rendering areas (corresponding to a shaded part in the right display interface in FIG. 11), and other areas are low rendering areas.

Figure 12:
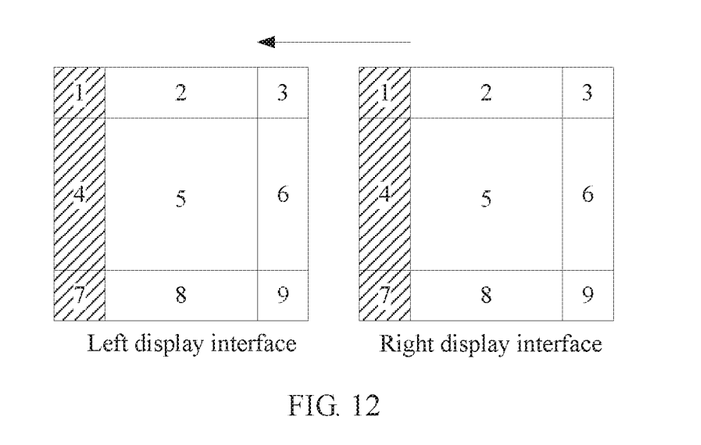
FIG. 12 is a schematic diagram of an example of another image rendering method according to an embodiment of this application.

As shown in FIG. 12, if the moving direction of the head of the user wearing the VR device is from right to left, both the fifth rendering areas that are in the left display interface and the right display interface and that correspond to visual centers are high rendering areas, the first rendering area, the fourth rendering area, and the seventh rendering area in the left display interface are middle rendering areas (corresponding to a shaded part in the left display interface in FIG. 12), the first rendering area, the fourth rendering area, and the seventh rendering area in the right display interface are middle rendering areas (corresponding to a shaded part in the right display interface in FIG. 12), and other areas are low rendering areas.

Figure 13:
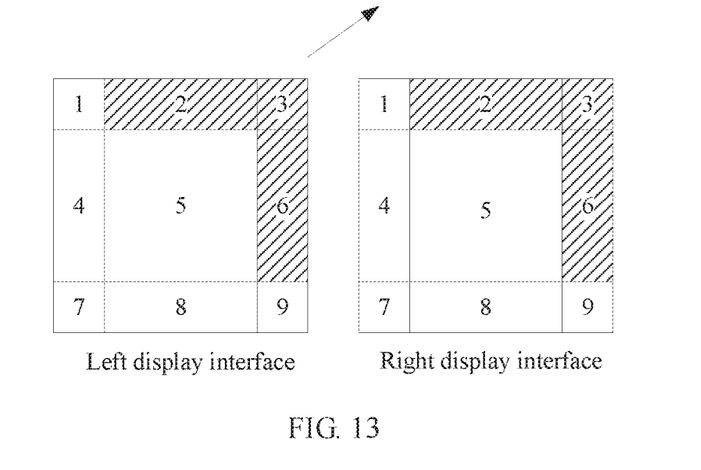
FIG. 13 is a schematic diagram of an example of another image rendering method according to an embodiment of this application.

As shown in FIG. 13, if the head of the user wearing the VR device moves obliquely, for example, from lower left to upper right, both the fifth rendering areas that are in the left display interface and the right display interface and that correspond to visual centers are high rendering areas, the second rendering areas, the third rendering areas, and the sixth rendering areas in the left display interface and the right display interface are middle rendering areas (corresponding to shaded parts in FIG. 13), and other areas are low rendering areas.

Certainly, a division manner is not limited to the foregoing enumerated division manners of the display interface in this application. For example, alternatively, the display interface may be evenly divided into a plurality of areas, and then a high rendering area, a middle rendering area, and a low rendering area are determined based on the moving direction of the head of the user wearing the VR device. Alternatively, a center point of the display interface may be used as a field of view center, and an area in which a circle whose radius is 65% of a half diagonal of the display interface is located is used as a high rendering area. Then a middle rendering area and a low rendering area other than the high rendering area are determined based on the moving direction of the head of the user. Other division manners are not listed herein.

The foregoing mainly describes, from a perspective of the VR device, the solutions provided in the embodiments of the present invention. It may be understood that the VR device includes a corresponding hardware structure and/or software module for performing each function. A person skilled in the art should easily be aware that, in combination with examples of units and algorithms steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of this application, function module division may be performed on the VR device based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, and is merely logical function division. There may be another division manner during actual implementation.

Figure 14:
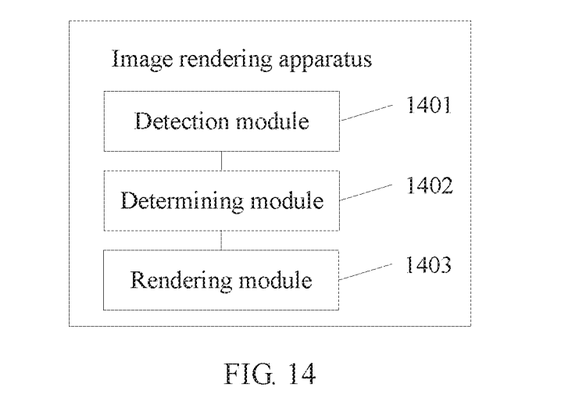
FIG. 14 is a schematic structural diagram of an image rendering apparatus according to an embodiment of this application.

When each function module is obtained through division based on each corresponding function, an embodiment of this application provides an image rendering apparatus, and the apparatus may be implemented as the VR device in the foregoing embodiment. FIG. 14 is a possible schematic structural diagram of the VR device in the foregoing embodiment. The VR device includes a detection module 1401, a determining module 1402, and a rendering module 1403.

The detection module 1401 is configured to support the VR device in performing step 301 in FIG. 3. The determining module 1402 is configured to support the VR device in performing step 302 in FIG. 3. The rendering module 1403 is configured to support the VR device in performing step 303 in FIG. 3.

All related content of the steps in the foregoing method embodiment may be cited in function descriptions of corresponding function modules, and details are not described herein.

When an integrated unit is used, it should be noted that the detection module 1401 shown in FIG. 14 may be integrated into the motion sensor 203 shown in FIG. 2, so that the motion sensor 203 performs a specific function of the detection module 1401. The determining module 1402 and the rendering module 1403 shown in FIG. 14 may be integrated into the processor 204 shown in FIG. 2, so that the processor 204 performs specific functions of the determining module 1402 and the rendering module 1403.

An embodiment of this application further provides a computer readable storage medium, and the computer readable storage medium stores an instruction. When the instruction is run on a computer, the computer is enabled to perform the method in the foregoing method embodiment.

An embodiment of this application further provides a computer program product including an instruction. When the instruction is run on a computer, the computer is enabled to perform the method in the foregoing method embodiment.

Based on the foregoing descriptions of the implementations, a person skilled in the art may clearly understand that this application may be implemented by software in addition to necessary universal hardware or by hardware only. In most circumstances, the former is a better implementation. Based on such an understanding, the technical solutions of this application essentially or the part contributing to the prior art may be implemented in a form of a software product. The computer software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An image rendering method, comprising:
   detecting a moving direction of a head of a user wearing a virtual reality (VR) device using a motion sensor;
   determining at least two rendering areas in a display interface based on the moving direction; and
   rendering, using different rendering intensity coefficients, images displayed in different rendering areas, wherein the rendering intensity coefficients are numbers greater than zero and less than or equal to one and correspond to picture quality, and wherein a rendering intensity coefficient of a rendering area to which the moving direction points is greater than a rendering intensity coefficient of a rendering area to which an opposite direction of the moving direction points such that the rendering area to which the moving direction points has a higher picture quality than the rendering area to which the opposite direction of the moving direction points.

2. The image rendering method of claim 1, wherein determining the at least two rendering areas comprises:
   determining that an area with a preset range centered at a center point of the display interface is a high rendering area;
   determining that an area to which the moving direction points is a middle rendering area; and
   determining that an area other than the high rendering area and the middle rendering area in the display interface is a low rendering area.

3. The image rendering method of claim 2, wherein the preset range corresponds to an inscribed square of a circle whose radius is sixty five percent of a half diagonal of each display interface.

4. The image rendering method of claim 2, wherein the VR device comprises a left display interface and a right display interface, wherein each display interface is divided into three rendering areas, wherein an area with a preset range centered at a center point of each display interface is a first rendering area, wherein an area that is to a left of the center point other than the first rendering area in each display interface is a second rendering area, and wherein an area that is to a right of the center point other than the first rendering area in each display interface is a third rendering area.

5. The image rendering method of claim 1, wherein the VR device comprises a left display interface and a right display interface, wherein each display interface is divided into three rendering areas, wherein an area with a preset range centered at a center point of each display interface is a first rendering area, wherein an area that is to a left of the center point other than the first rendering area in each display interface is a second rendering area, and wherein an area that is to a right of the center point other than the first rendering area in each display interface is a third rendering area.

6. The image rendering method of claim 5, wherein determining the at least two rendering areas comprises:
   determining that in the left display interface, a first rendering area is a first high rendering area, a third rendering area is a first middle rendering area, and a second rendering area is a first low rendering area, and determining that in the right display interface, a first rendering area is a second high rendering area, a second rendering area is a second middle rendering area, and a third rendering area is a second low rendering area when the head of the user wearing the VR device is in a still state;
   determining that in the left display interface, the first rendering area is a third high rendering area, the third rendering area is a third middle rendering area, and the second rendering area is a third low rendering area, and determining that in the right display interface, the first rendering area is a fourth high rendering area, the third rendering area is a fourth middle rendering area, and the second rendering area is a fourth low rendering area when the moving direction is from left to right; and
   determining that in the left display interface, the first rendering area is a fifth high rendering area, the second rendering area is a fifth middle rendering area, and the third rendering area is a fifth low rendering area, and determining that in the right display interface, the first rendering area is a sixth high rendering area, the second rendering area is a sixth middle rendering area, and the third rendering area is a sixth low rendering area when the moving direction is from right to left.

7. The image rendering method of claim 1, wherein a first rendering intensity coefficient is one, wherein a second rendering intensity coefficient is greater than zero point five and less than one, and wherein a third rendering intensity coefficient is greater than zero point two and less than zero point five.

8. A virtual reality (VR) device, comprising:
   a display;
   a motion sensor configured to detect a moving direction of a head of a user wearing the VR device; and
   a processor coupled to the motion sensor and the display and configured to:
     determine at least two rendering areas in a display interface based on the moving direction; and
     render, using different rendering intensity coefficients, images displayed in different rendering areas, wherein the rendering intensity coefficients are numbers greater than zero and less than or equal to one and correspond to picture quality, and wherein a first rendering intensity coefficient of a first rendering area to which the moving direction points is greater than a rendering intensity coefficient of a rendering area to which an opposite direction of the moving direction points such that the rendering area to which the moving direction points has a higher picture quality than the rendering area to which the opposite direction of the moving direction points.

9. The VR device of claim 8, wherein when determining the at least two rendering areas, the processor is further configured to:
   determine that an area with a preset range centered at a center point of the display interface is a high rendering area;
   determine that an area to which the moving direction detected by the motion sensor points is a middle rendering area; and
   determine that an area other than the high rendering area and the middle rendering area in the display interface is a low rendering area.

10. The VR device of claim 9, wherein the preset range corresponds to an inscribed square of a circle whose radius is sixty five percent of a half diagonal of each display interface.

11. The VR device of claim 9, wherein the VR device comprises a left display interface and a right display interface, wherein each display interface is divided into three rendering areas, wherein an area with a preset range centered at a center point of each display interface is a first rendering area, wherein an area that is to a left of the center point other than the first rendering area in each display interface is a second rendering area, and wherein an area that is to a right of the center point other than the first rendering area in each display interface is a third rendering area.

12. The VR device of claim 8, wherein the VR device comprises a left display interface and a right display interface, wherein each display interface is divided into three rendering areas, wherein an area with a preset range centered at a center point of each display interface is a first rendering area, wherein an area that is to a left of the center point other than the first rendering area in each display interface is a second rendering area, and wherein an area that is to a right of the center point other than the first rendering area in each display interface is a third rendering area.

13. The VR device of claim 12, wherein when determining the at least two rendering areas, the processor is further configured to:
   determine that in the left display interface, a first rendering area is a first high rendering area, a third rendering area is a first middle rendering area, and a second rendering area is a first low rendering area, and determine that in the right display interface, a first rendering area is a second high rendering area, a second rendering area is a second middle rendering area, and a third rendering area is a second low rendering area when the head of the user wearing the VR device is in a still state;
   determine that in the left display interface, the first rendering area is a third high rendering area, the third rendering area is a third middle rendering area, and the second rendering area is a third low rendering area, and determine that in the right display interface, the first rendering area is a fourth high rendering area, the third rendering area is a fourth middle rendering area, and the second rendering area is a fourth low rendering area when the moving direction is from left to right; and
   determine that in the left display interface, the first rendering area is a fifth high rendering area, the second rendering area is a fifth middle rendering area, and the third rendering area is a fifth low rendering area, and determine that in the right display interface, the first rendering area is a sixth high rendering area, the second rendering area is a sixth middle rendering area, and the third rendering area is a sixth low rendering area when the moving direction is from right to left.

14. The VR device of claim 8, wherein a first rendering intensity coefficient is one, wherein a second rendering intensity coefficient is greater than zero point five and less than one, and wherein a third rendering intensity coefficient is greater than zero point two and less than zero point five.

15. A non-transitory computer readable storage medium comprising an instruction, wherein the instruction causes a computer to:
   detect a moving direction of a head of a user wearing a virtual reality (VR) device using a motion sensor;
   determine at least two rendering areas in a display interface based on the moving direction; and
   render, using different rendering intensity coefficients, images displayed in different rendering areas, wherein the rendering intensity coefficients are numbers greater than zero and less than or equal to one and correspond to picture quality, and wherein a rendering intensity coefficient of a rendering area to which the moving direction points is greater than a rendering intensity coefficient of a rendering area to which an opposite direction of the moving direction points such that the rendering area to which the moving direction points has a higher picture quality than the rendering area to which the opposite direction of the moving direction points.

16. The non-transitory computer readable storage medium of claim 15, wherein when determining the at least two rendering areas, the instruction further causes the computer to:
   determine that an area with a preset range centered at a center point of the display interface is a high rendering area;
   determine that an area to which the moving direction points is a middle rendering area; and
   determine that an area other than the high rendering area and the middle rendering area in the display interface is a low rendering area.

17. The non-transitory computer readable storage medium of claim 15, wherein the VR device comprises a left display interface and a right display interface, wherein each display interface is divided into three rendering areas, wherein an area with a preset range centered at a center point of each display interface is a first rendering area, wherein an area that is to a left of the center point other than the first rendering area in each display interface is a second rendering area, and wherein an area that is to a right of the center point other than the first rendering area in each display interface is a third rendering area.

18. The non-transitory computer readable storage medium of claim 17, wherein when determining the at least two rendering areas, the instruction further causes the computer to:
   determine that in the left display interface, a first rendering area is a first high rendering area, a third rendering area is a first middle rendering area, and a second rendering area is a first low rendering area, and determine that in the right display interface, a first rendering area is a second high rendering area, a second rendering area is a second middle rendering area, and a third rendering area is a second low rendering area when the head of the user wearing the VR device is in a still state;

determine that in the left display interface, the first rendering area is a third high rendering area, the third rendering area is a third middle rendering area, and the second rendering area is a third low rendering area, and determine that in the right display interface, the first rendering area is a fourth high rendering area, the third rendering area is a fourth middle rendering area, and the second rendering area is a fourth low rendering area when the moving direction is from left to right; and determine that in the left display interface, the first rendering area is a fifth high rendering area, the second rendering area is a fifth middle rendering area, and the third rendering area is a fifth low rendering area, and determine that in the right display interface, the first rendering area is a sixth high rendering area, the second rendering area is a sixth middle rendering area, and the third rendering area is a sixth low rendering area when the moving direction is from right to left.

19. The non-transitory computer readable storage medium of claim 15, wherein a first rendering intensity coefficient is one, wherein a second rendering intensity coefficient is greater than zero point five and less than one, and wherein a third rendering intensity coefficient is greater than zero point two and less than zero point five.

20. The non-transitory computer readable storage medium of claim 15, wherein a preset range corresponds to an inscribed square of a circle whose radius is sixty five percent of a half diagonal of each display interface.

* * * * *